US010713932B2

(12) United States Patent
Singh

(10) Patent No.: US 10,713,932 B2
(45) Date of Patent: Jul. 14, 2020

(54) WIDE AREA EMERGENCY ALERT AND RESPONSE SYSTEM USING HYBRID NETWORKS

(71) Applicant: Telcom Ventures, LLC, Miami, FL (US)

(72) Inventor: Rajendra Singh, Indian Creek Village, FL (US)

(73) Assignee: TELCOM VENTURES, LLC, Miami, FL (US)

( * ) Notice: Subject to any disclaimer, the term of this patent is extended or adjusted under 35 U.S.C. 154(b) by 0 days.

(21) Appl. No.: 16/413,813

(22) Filed: May 16, 2019

(65) Prior Publication Data

US 2019/0355237 A1    Nov. 21, 2019

Related U.S. Application Data

(60) Provisional application No. 62/673,179, filed on May 18, 2018.

(51) Int. Cl.
| | |
|---|---|
| *G08B 27/00* | (2006.01) |
| *H04H 20/59* | (2008.01) |
| *H04L 5/00* | (2006.01) |
| *H04W 4/90* | (2018.01) |
| *H04L 27/26* | (2006.01) |

(52) U.S. Cl.
CPC .......... *G08B 27/008* (2013.01); *H04H 20/59* (2013.01); *H04L 5/0055* (2013.01); *H04L 27/2646* (2013.01); *H04W 4/90* (2018.02)

(58) Field of Classification Search
CPC ...... G08B 27/008; H04W 4/90; H04W 88/06; H04W 16/14; H04W 4/02; H04H 20/59; H04H 20/72; H04H 20/74; H04L 5/0055; H04L 27/2646
See application file for complete search history.

(56) References Cited

U.S. PATENT DOCUMENTS

| | | | | |
|---|---|---|---|---|
| 2006/0189309 | A1* | 8/2006 | Good | H04B 7/18563 455/427 |
| 2012/0164968 | A1* | 6/2012 | Velusamy | G08G 1/205 455/404.2 |
| 2013/0278418 | A1* | 10/2013 | Vallaire | G08B 27/00 340/539.13 |
| 2014/0130159 | A1* | 5/2014 | Raman | G06F 21/554 726/23 |

\* cited by examiner

*Primary Examiner* — George Eng
*Assistant Examiner* — Umair Ahsan
(74) *Attorney, Agent, or Firm* — Myers Bigel, P.A.

(57) ABSTRACT

Methods of issuing an emergency alert in a geographical area serviced by a Mobile Satellite Service (MSS) satellite and a terrestrial Broadband Wireless Access (BWA) base station are provided. A method includes receiving a first emergency alert message from the MSS satellite by a user equipment in the geographical area using a first radio frequency band, and receiving a second emergency alert message from the terrestrial BWA base station by the user equipment in the geographical area using a second radio frequency band. Related devices and systems are provided.

6 Claims, 7 Drawing Sheets

WIDE AREA EMERGENCY ALERT AND RESPONSE SYSTEM USING HYBRID NETWORKS

CROSS REFERENCE TO RELATED APPLICATION

The present application claims the benefit of U.S. Provisional Patent Application Ser. No. 62/673,179, filed May 18, 2018, the disclosure of which is herein incorporated in its entirety by reference.

BACKGROUND

Broadband Wireless Access (BWA) systems tend to have a limited geographical coverage and tend to primarily cover areas of high demand for services. Mobile Satellite Service (MSS) has difficulty covering urban and suburban areas due to shadowing and/or obstruction from man-made structures. MSS systems also have difficulty providing in-building coverage. The limitations of BWA systems and MSS systems may be particularly notable in cases of emergencies or disasters.

SUMMARY

Various embodiments of the present invention are directed to a method for issuing an emergency alert in a geographical area serviced by a MSS satellite and a terrestrial BWA base station. The method includes receiving a first emergency alert message from the MSS satellite by a user equipment in the geographical area using a first radio frequency band, and receiving a second emergency alert message from the terrestrial BWA base station by the user equipment in the geographical area using a second radio frequency band.

According to some embodiments, the second radio frequency band may be non-overlapping with the first radio frequency band. In some embodiments, the first radio frequency band may overlap the second radio frequency band. The first radio frequency band may be associated with a first blanking interval that does not overlap in time with a second blanking interval associated with the second radio frequency band. The first emergency alert message may be received from the MSS satellite during the second blanking interval. the second emergency alert message may be received from the terrestrial BWA base station during the first blanking interval.

According to some embodiments, the first radio frequency band may overlap the second radio frequency band. The first radio frequency band may be associated with a first frequency guard band that does not overlap in frequency with a second frequency guard band associated with the second radio frequency band. the first emergency alert message may be received from the MSS satellite in the second frequency guard band. The second emergency alert message may be received from the terrestrial BWA base station in the first frequency guard band.

According to some embodiments, the method may include responding to the first emergency alert message and/or the second emergency alert message by the user equipment with an indication of whether emergency assistance is needed. The indication may provide a request for the emergency assistance responsive to a lack of a user interaction responsive to the first emergency alert message and/or the second emergency alert message. The indication may be provided when a user of the user equipment has not accessed the user equipment in a threshold period of time.

Various embodiments of the present invention are directed to a method of providing emergency alerts to one or more user equipments in a geographical area serviced by a MSS satellite and a terrestrial BWA base station. The method includes transmitting a first emergency alert message from the MSS satellite in a radio frequency band, transmitting a second emergency alert message from the terrestrial BWA base station in the radio frequency band, and generating a request for emergency services in the geographical area of the one or more user equipments.

According to some embodiments, the method may include receiving at least one of a first response message from a first user equipment of the one or more user equipments or a second response message from the first user equipment. The first response message may be responsive to the first emergency alert message and the second response message is responsive to the second emergency alert message. The first response message or the second response message may include a request for emergency assistance indicating that a user of the first user equipment has not accessed the user equipment in a threshold period of time. The threshold period of time may be configurable by the user of the first user equipment. The request for emergency services may be generated responsive to lack of receipt of one or more acknowledgment messages corresponding to the one or more user equipments within a timeout interval. The MSS satellite may generate the request for emergency services responsive to not receiving a first response to the first emergency alert message. The terrestrial BWA base station may generate the request for emergency services responsive to not receiving a second response to the second emergency alert message.

Various embodiments of the present invention are directed to a method of handling emergency alerts from a MSS satellite and a terrestrial BWA base station in a user equipment. The method includes receiving a first emergency alert message from the MSS satellite or a second emergency alert message from the terrestrial BWA base station, determining whether a user of the user equipment has not accessed the user equipment in a threshold period of time, and transmitting a first response message to the MSS satellite responsive to the first emergency alert message or a second response message to the terrestrial BWA base station responsive to the second emergency alert message. The first response message or the second response message may include a request for emergency assistance responsive to the determining whether the user of the user equipment has not accessed the user equipment in a threshold period of time.

Various embodiments of the present invention are directed to a method of providing emergency alerts. The method includes receiving, by a terrestrial BWA base station from a MSS satellite, an indication of an emergency event, and transmitting, by the terrestrial BWA base station, an emergency alert message to a user equipment, responsive to the receiving the indication of the emergency event from the MSS satellite.

According to some embodiments, the terrestrial BWA base station may be configured to relay the indication of the emergency event received from the MSS satellite to the user equipment in the emergency alert message. The method may include determining that emergency assistance is needed by a user of the user equipment. Determining that emergency assistance is needed by the user of the user equipment may include determining that emergency assistance is needed by the user of the user equipment, responsive to lack of receipt of an acknowledgment message from the user equipment within a timeout interval. Determining that emergency assistance is needed by the user may be performed by the terrestrial BWA base station. The terrestrial BWA base station may receive the indication of an emergency event from the MSS satellite after the terrestrial BWA base station loses communication with a control station of a terrestrial BWA network associated with the terrestrial BWA base station and before restoration of the communication with the control station.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

DETAILED DESCRIPTION

In a case of disaster or emergency, it may be desirable to provide a ubiquitous and/or broad geographical coverage. Here we provide a method and associated devices that simultaneously use BWA and MSS to provide ubiquitous coverage with added reliability in certain areas. An emergency center (EC) may send an emergency/alert message to a satellite ground station (GS) and the BWA system. This emergency/alert message may be transmitted over a wired link, a wireless link, and/or a connection via a cloud network.

Figure 1:
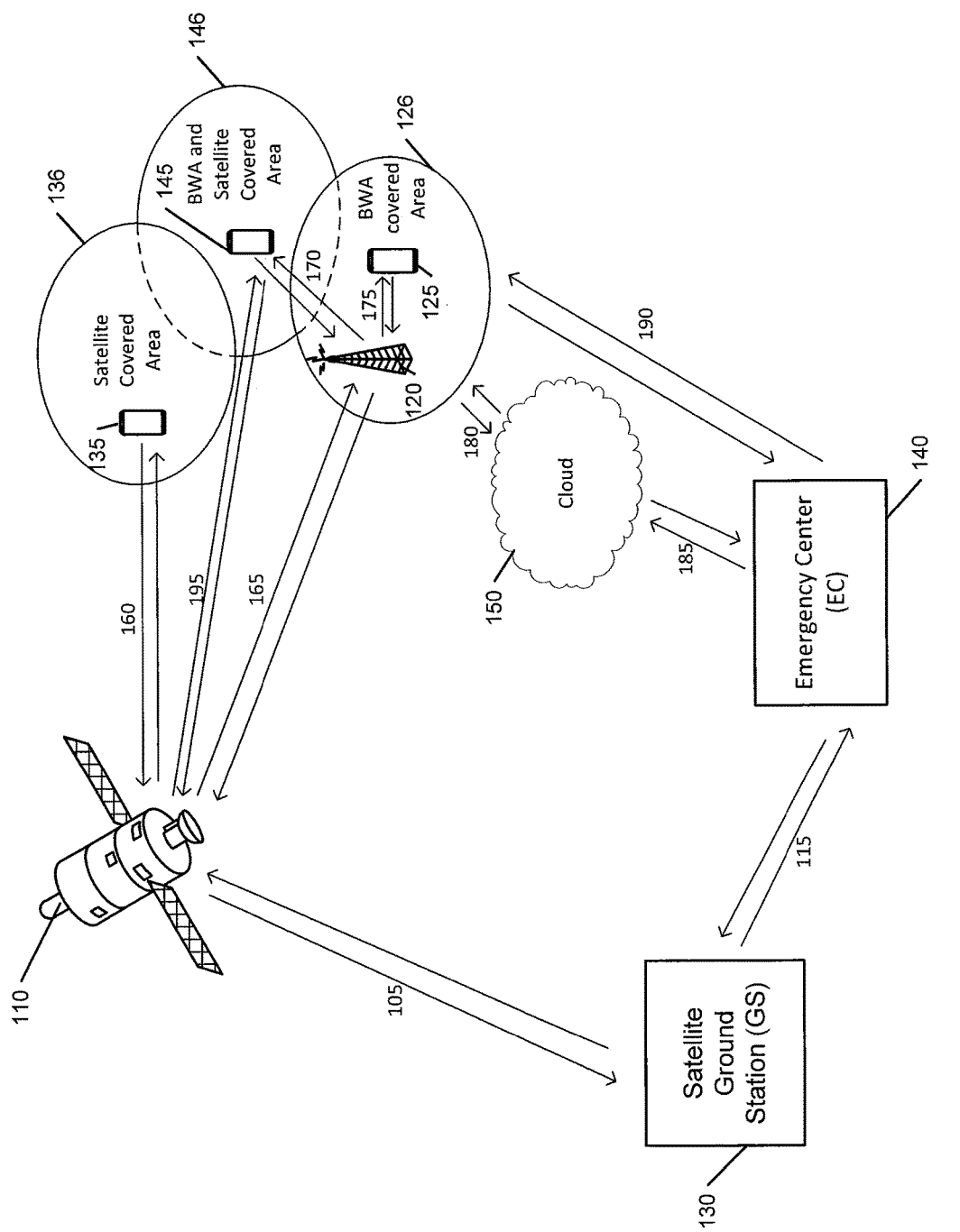
FIG. 1 illustrates a MSS network that coexists with a BWA network, according to various embodiments described herein.

FIG. 1 illustrates a MSS network that coexists with a BWA network. Various links of FIG. 1 include:
- 105—Feeder links between the ground station and satellite
- 160—MSS links from satellite to UE (both up and down links)
- 195—MSS links to UE (also covered by BWA)
- 170—BWA link to UE (also covered by MSS)
- 175—BWA link to UE
- 190—Data link between EC and BWA
- 115—Data link between EC and GS
- 185—Data link between EC and Cloud
- 180—Link between BWA and cloud
- 165—Link between satellite and BWA network MSS signals may have difficulty providing in-building coverage whereas a BWA network may experience network congestion as well as weather-related signal deterioration. The BWA network and the MSS network may be used in conjunction with one another to improve the reliability of alert messages reaching devices in areas covered by both networks. The terrestrial BWA base station may provide communication using various protocols such as cellular, 3G, 4G, LTE, or 5G communication protocols.

Connected devices embedded in the BWA and MSS networks, also referred to as embedded devices, may be capable of responding to alert messages received from a base station. Messages sent from a base station such as a BWA base station to connected devices, such as a user equipment (UE), may trigger a feedback message or response message from the UE to the base station.

A user may be requested to respond to an alert message received at the UE. In some embodiments, a crowd sourcing concept related to handling of alert messages may be used. For example, one or more UEs may automatically respond to the base station upon receipt of the alert message. The responses to the alert messages may be indicative of the density of users in a geographical area affected by an emergency and assist a network operator in making decisions regarding the dispatch of emergency assistance such as ambulances, firetrucks, etc. For example, a high concentration of responses to alert messages from a particular geographic area may trigger dispatching a higher number of ambulances and/or firetrucks to that particular geographical area.

In cases of emergencies such as natural disasters, the UE may be separated from the user. Upon receipt of an alert message, the UE may determine that the user is not able to respond to confirm receipt of the alert based on a period of user inactivity. This may occur in cases of injury, entrapment, panic, unconsciousness, or death of a user resulting from a natural disaster. If the user is not able to respond, the UE may automatically confirm receipt and/or send a request for assistance for the user. The period of user inactivity may be based on a threshold period of time in which the user has not accessed the phone, or may be based on a time period since the activity and/or event that triggered the alert. For example, if a tornado touches down in a geographical area, the time period of user inactivity may be the time since the tornado touched down. If the user does not access the connected device upon receipt of the alert, the connected device may make a request to Emergency Services for assistance for the user. In some embodiments, the connected device may respond to the alert automatically from a software stack that runs on the application for handling alert messages. The software stack running on the alert application of one or more devices may automatically acknowledge receipt of alert messages such that a network operator is aware that one or more devices in the geographical area related to the alert messages are receiving the alert messages.

A connected device may be connected and/or in communication to both the MSS system and the BWA system. The connected device may be co-located with BWA base stations to send the emergency/alert message and/or related acknowledgement messages directly to the BWA base station/stations. The ground station may send an emergency/alert message to the MSS system, which in turn will send the emergency/alert message to connected devices. The BWA base stations may pass on the emergency/alert message to the connected devices. Alert messages may be ordered and/or prioritized by the BWA base station based on various parameters such as importance, severity of threat, agency of origination of the message, etc.

The BWA system may prioritize which of the BWA system or the MSS system it will use for directing the emergency/alert message, depending on parameters such as signal strength and/or network capacity. In some embodiments, a satellite receiver may be co-located with the BWA base station. The satellite receiver may receive an alert message from the satellite and retransmit the alert message to the connected devices through the BWA network. The BWA backhaul and/or wireless connections may be used for the retransmission. In some embodiments, a cloud network may be used to transport messages from the EC to the BWA network. The cloud network may be used instead of a dedicated backhaul network to provide multiple potential routings to the BWA network, which may improve reliability over the dedicated backhaul network.

In some embodiments, an alert message may be transmitted to connected devices using both the BWA network and the MSS network. Using both networks may improve reliability of the connected devices receiving the alert message if the BWA network and/or the MSS network experience interference and/or weak signal strength.

Additionally, in cases where the BWA network and the MSS network use the same radio frequency spectrum for communications in an overlapped geographical area, the BWA network and the MSS network may be configured to use different portions of the radio spectrum to improve reliability of the alert messages reaching the connected devices. In some embodiments, the BWA network and the MSS network may use the same sections of the radio spectrum but have different blanking intervals or guard bands which may allow the BWA network and the MSS network to transmit alert messages without interference from each other. In other words, the blanking intervals or guard bands for the BWA network and the MSS network may be non-overlapping in order to provide dedicated access to the same portion of the radio spectrum to each of the BWA and MSS networks at various times. This strategy circumvents interference between the BWA network and the MSS network that are using the same radio frequency spectrum.

Referring again to FIG. 1, a satellite 110 of the MSS network may communicate with a satellite ground station 130 via feeder link 105. The satellite 110 may communicate with BWA base station 120 using link 165. For example, the BWA base station 120 may have a co-located satellite receiver that communicates with the satellite 110 via link 165. The satellite 110 may communicate with a UE 135 in a satellite coverage area 136 using MSS link 160. The satellite 110 may communicate with UE 145 that is in a BWA and a MSS coverage area 146. Satellite 110 may communicate with BWA base station 120. BWA base station 120 may communicate with UE 125 that is in a BWA coverage area 126 using BWA link 175. The BWA base station 120 may communicate with UE 145 using BWA link 170. A data link 190 may provide communication for emergency messages between the EC 140 and the BWA base station 120. In some embodiments, the EC 140 may communicate via data link 185 to a cloud based network 150 that communicates using data link 180 to BWA base station 120. The satellite ground station 130 may communicate with the EC 140 using data link 115.

Figure 2:
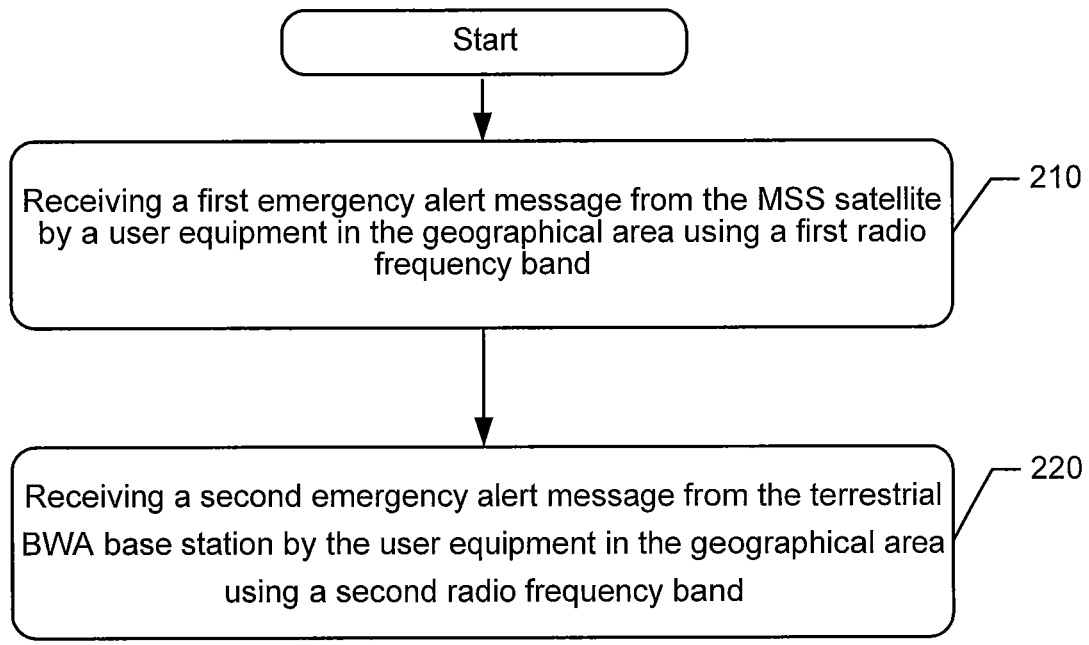
FIGS. 2 to 9 are flowcharts of operations for issuing an emergency alert in a geographical area serviced by a MSS satellite and a terrestrial BWA base station, according to various embodiments described herein.

FIG. 2 is a flowchart of operations for issuing an emergency alert in a geographical area serviced by the MSS satellite 110 and the terrestrial BWA base station 120 of FIG. 1. Referring to FIG. 2, a first emergency alert message from the MSS satellite 110 may be received by a UE in the geographical area using a first radio frequency band, at block 210. A second emergency alert message from the terrestrial BWA base station 120 may be received by the UE in the geographical area using a second radio frequency band, at block 220. The first and second emergency alert messages are alerts related to a same event or disaster and may occur in close time proximity to one another, such as within minutes and hours of one another. The second radio frequency band may be non-overlapping with the first radio frequency band. In some embodiments, the first radio frequency band may overlap the second radio frequency band. In some embodiments, the first radio frequency band may be associated with a first blanking interval that does not overlap in time with a second blanking interval associated with the second radio frequency band. The first emergency alert message may be received from the MSS satellite 110 during the second blanking interval. The second emergency alert message may be received from the terrestrial BWA base station 120 during the first blanking interval. According to some embodiments, the first radio frequency band may overlap the second radio frequency band. The first radio frequency band may be associated with a first frequency guard band that does not overlap in frequency with a second frequency guard band associated with the second radio frequency band. The first emergency alert message may be received from the MSS satellite 110 in the second frequency guard band. The second emergency alert message may be received from the terrestrial BWA base station 120 in the first frequency guard band. Since the first emergency alert message from the MSS satellite 110 is in a guard band during which the terrestrial BWA base station 120 does not transmit, the terrestrial BWA base station 120 does not interfere with the first emergency alert message from the MSS satellite 110, even though same frequencies may be used by both the terrestrial BWA base station 120 and the MSS satellite 110.

Figure 3:
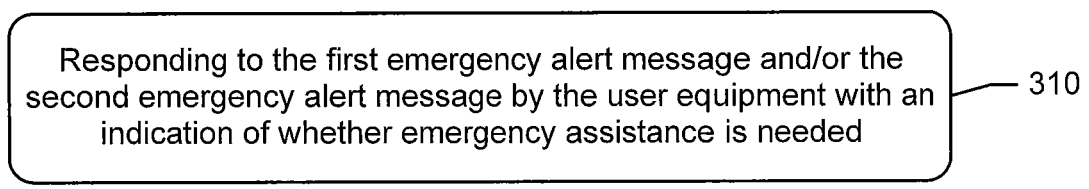

FIG. 3 is a flowchart of operations for issuing an emergency alert in a geographical area serviced by the MSS satellite 110 and the terrestrial BWA base station 120 of FIG. 1. Referring to FIG. 3, the UE may respond to the first emergency alert message and/or the second emergency alert message with an indication of whether emergency assistance is needed, at block 310. The indication may provide a request for the emergency assistance responsive to a lack of a user interaction responsive to the first emergency alert message and/or the second emergency alert message. The indication may be provided by the UE automatically, when a user of the UE has not accessed the UE in a threshold period of time.

Figure 4:
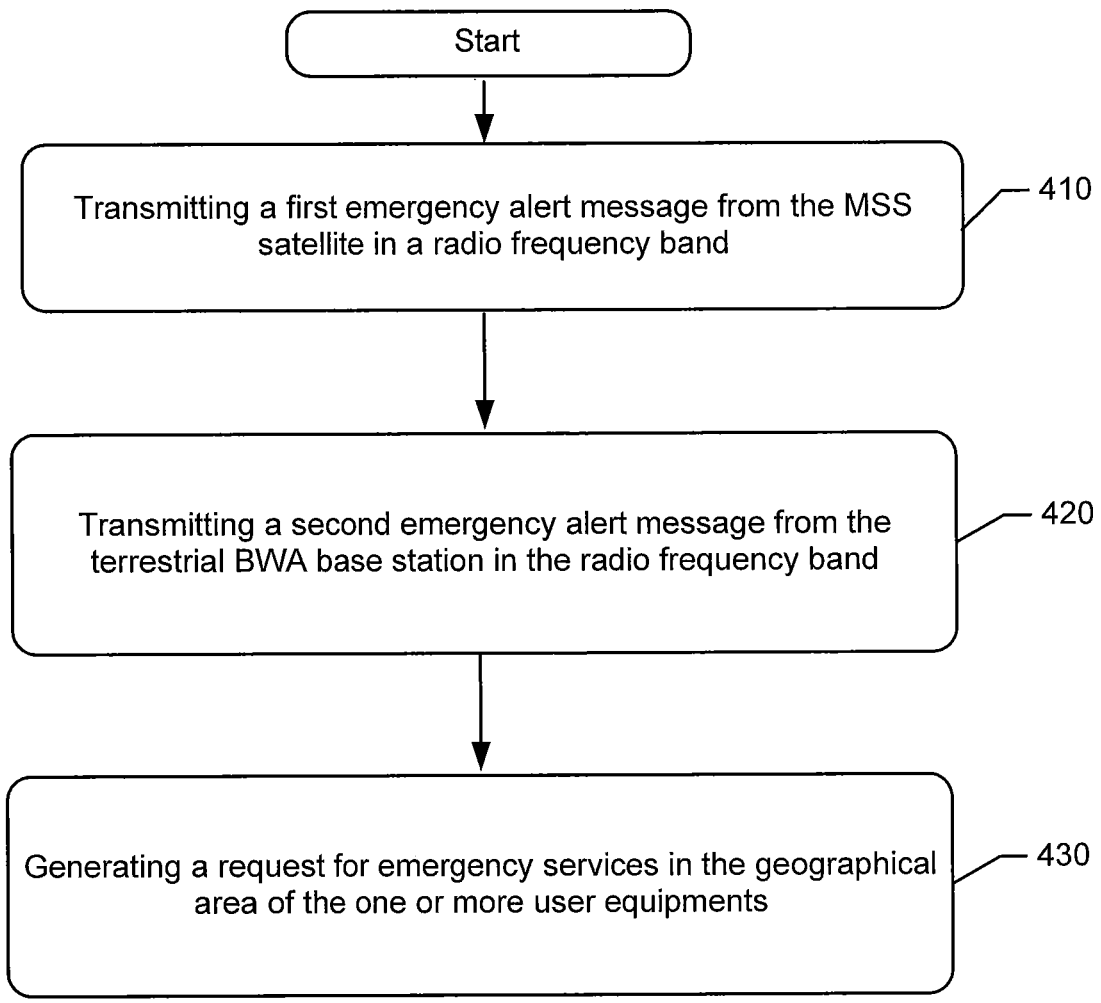

FIG. 4 is a flowchart of operations for providing emergency alerts to UEs in a geographical area serviced by the MSS satellite 110 and the terrestrial BWA base station 120 of FIG. 1. Referring to FIG. 4, a first emergency alert message may be transmitted from the MSS satellite 110 in a radio frequency band, at block 410. A second emergency alert message may be transmitted from the terrestrial BWA base station 120 in the radio frequency band, at block 420. A request for emergency services in the geographical area of the UEs may be generated, at block 430. The request for emergency services may be initiated by the Emergency Center upon determining that a threshold or predetermined number of UEs are in the geographical area affected by an emergency event. The request for emergency services may be based on the number of UEs in the geographical area that have not sent a user acknowledgement.

Figure 5:
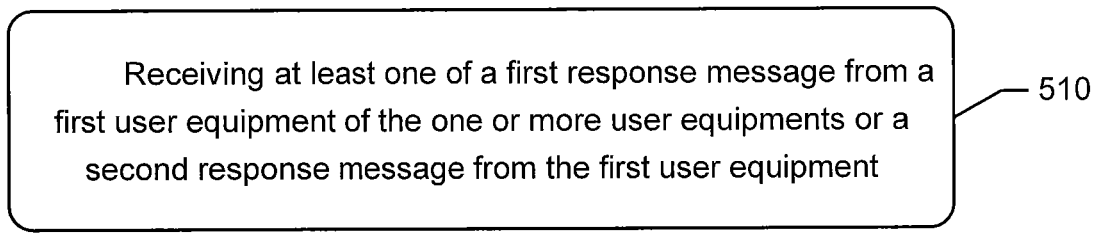

FIG. 5 is a flowchart of operations for providing emergency alerts to UEs in a geographical area serviced by the MSS satellite 110 and the terrestrial BWA base station 120 of FIG. 1. Referring to FIG. 5, a first response message from a first UE of the one or more UEs or a second response message from the first UE may be received, at block 510. The first response message may be responsive to the first emergency alert message and the second response message is responsive to the second emergency alert message. The first response message or the second response message may include a request for emergency assistance indicating that a user of the first UE has not accessed the UE in a threshold period of time. The threshold period of time may be configurable by the user of the first UE. The request for emergency services may be generated responsive to lack of receipt by MSS satellite 110 and/or the terrestrial BWA base station 120 of one or more acknowledgment messages corresponding to the one or more UEs within a timeout interval. The MSS satellite 110 may generate the request for emergency services responsive to not receiving a first response to the first emergency alert message. The terrestrial BWA base station 120 may generate the request for emergency services responsive to not receiving a second response to the second emergency alert message.

Figure 6:
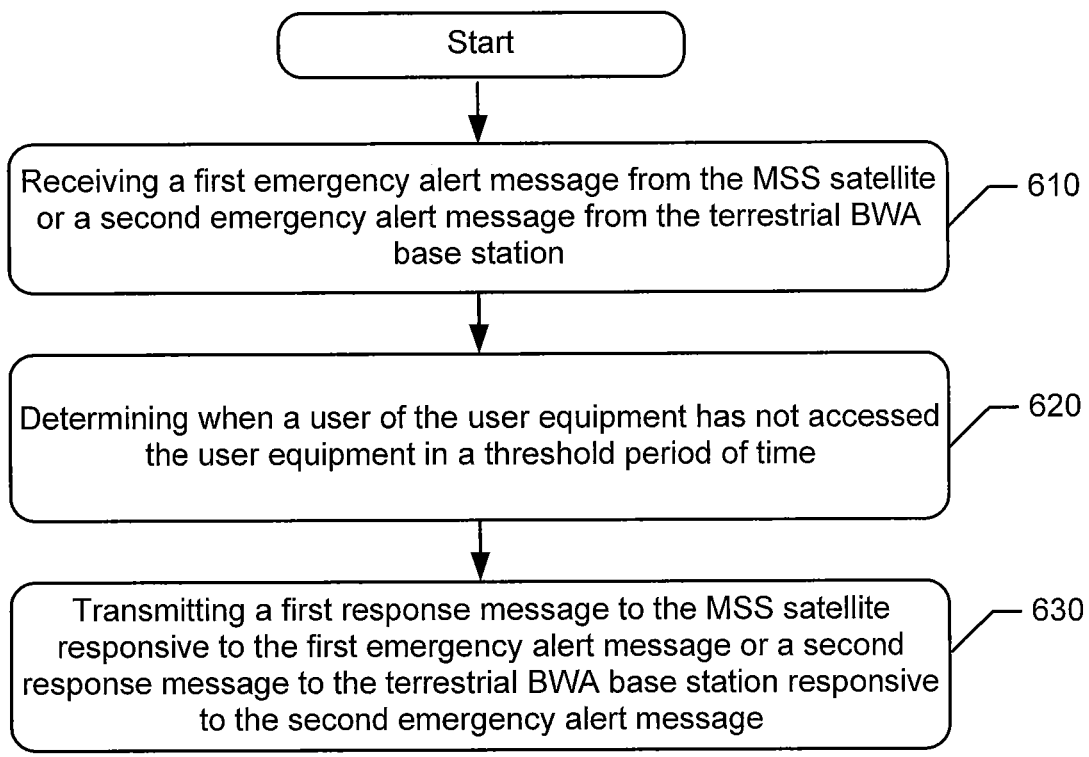

FIG. 6 is a flowchart of operations for handling emergency alerts from MSS satellite 110 and the terrestrial BWA base station 120 of FIG. 1 in a UE. Referring to FIG. 6, a first emergency alert message from the MSS satellite 110 or a second emergency alert message from the terrestrial BWA base station 120 may be received, at block 610. It may be determined that a user of the UE has not accessed the UE in a threshold period of time, at block 620. A first response message may be transmitted to the MSS satellite 110 responsive to the first emergency alert message or a second response message may be transmitted to the terrestrial BWA base station 120 responsive to the second emergency alert message, at block 630. The first response message or the second response message may include a request for emergency assistance responsive to determining that the user of the UE has not accessed the UE in a threshold period of time.

Figure 7:
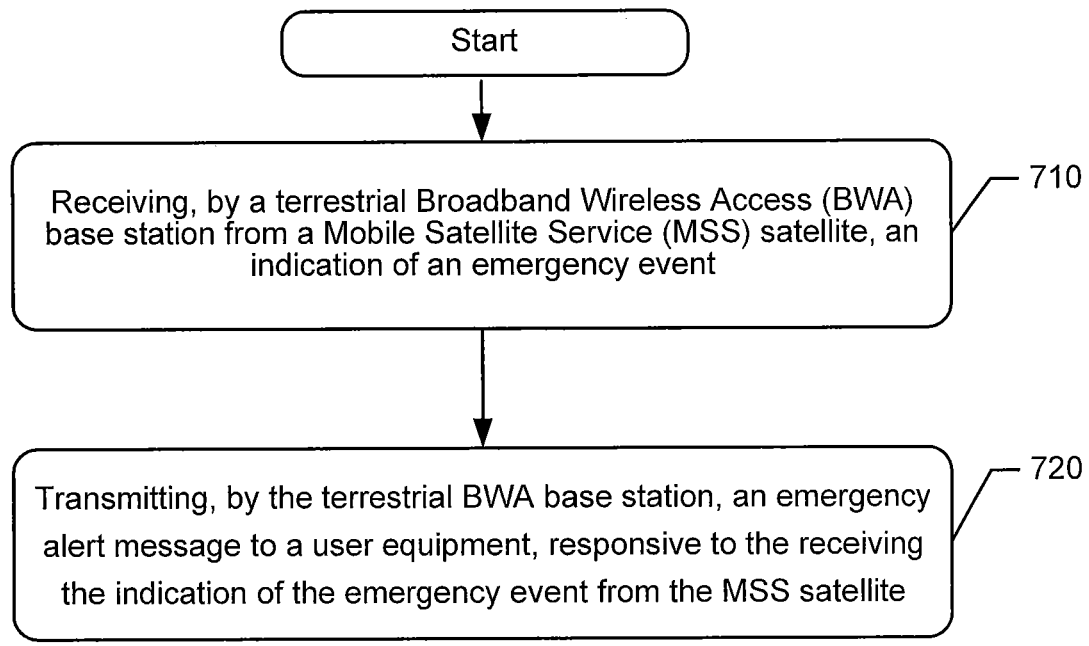

FIG. 7 is a flowchart of operations for providing emergency alerts. Referring to FIG. 7, a terrestrial BWA base station may receive an indication of an emergency event from a MSS satellite, at block 710. The terrestrial BWA base station may transmit an emergency alert message to a UE, responsive to receiving the indication of the emergency event from the MSS satellite, at block 720. For example, a satellite receiver at the terrestrial BWA base station may receive the indication of the emergency event and may serve as a repeater to send this indication to UEs in the geographical area that the terrestrial BWA base station is serving.

Figure 8:
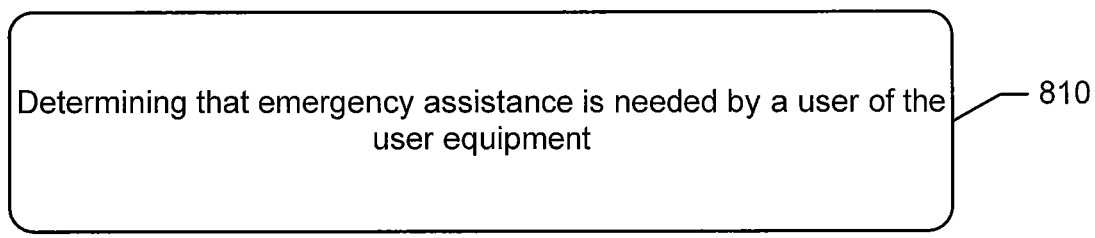
Figure 9:
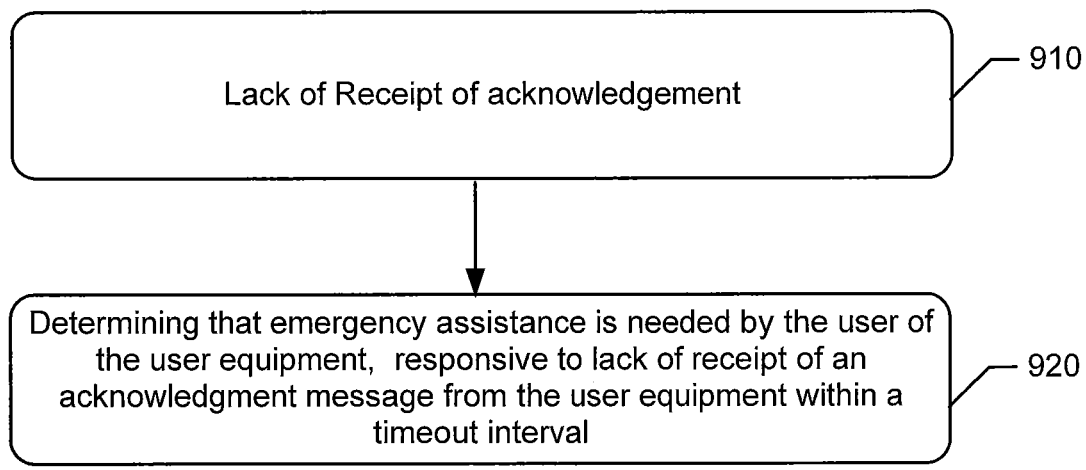

FIGS. 8 and 9 are flowcharts of operations for providing emergency alerts. A terrestrial BWA base station may be configured to relay an indication of an emergency event received from a MSS satellite to a UE in the emergency alert message. A determination that emergency assistance is needed by a user of the UE may be made, at block 810. A lack of receipt of an acknowledgment to an emergency alert message may be determined, at block 910. The determination that emergency assistance is needed by the user of the UE may be made responsive to lack of receipt or absence of an acknowledgment message from the UE within a timeout interval, at block 920. Determining that emergency assistance is needed by the user may be performed by the terrestrial BWA base station. The terrestrial BWA base station may lose communication with a control station and/or Emergency Center of a terrestrial BWA network but may receive the indication of an emergency event from the MSS satellite and proceed to notify UEs.

Figure 10:
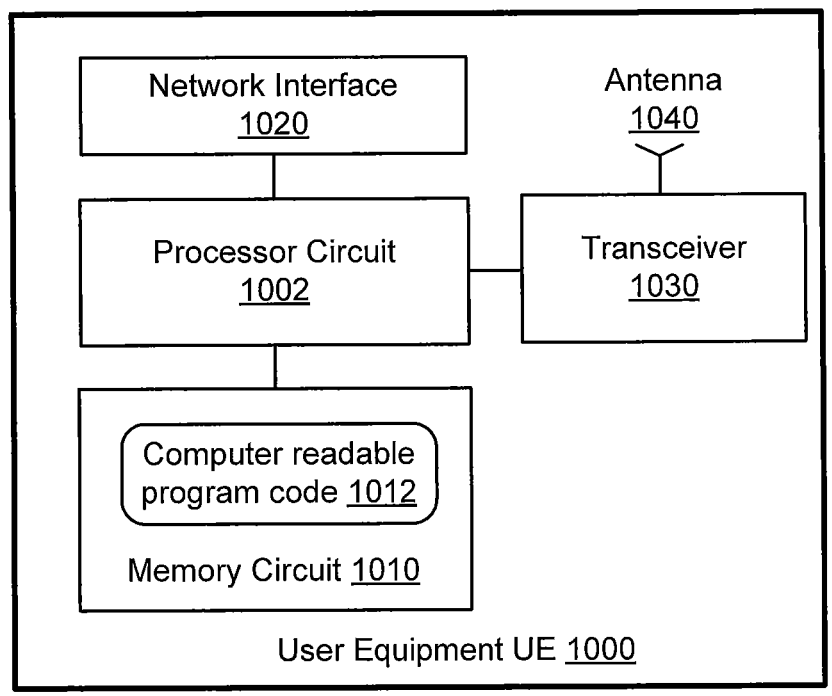
FIGS. 10 to 12 are block diagrams of devices for issuing an emergency alert in a geographical area serviced by a MSS satellite and a terrestrial BWA base station, according to various embodiments described herein.
Figure 11:
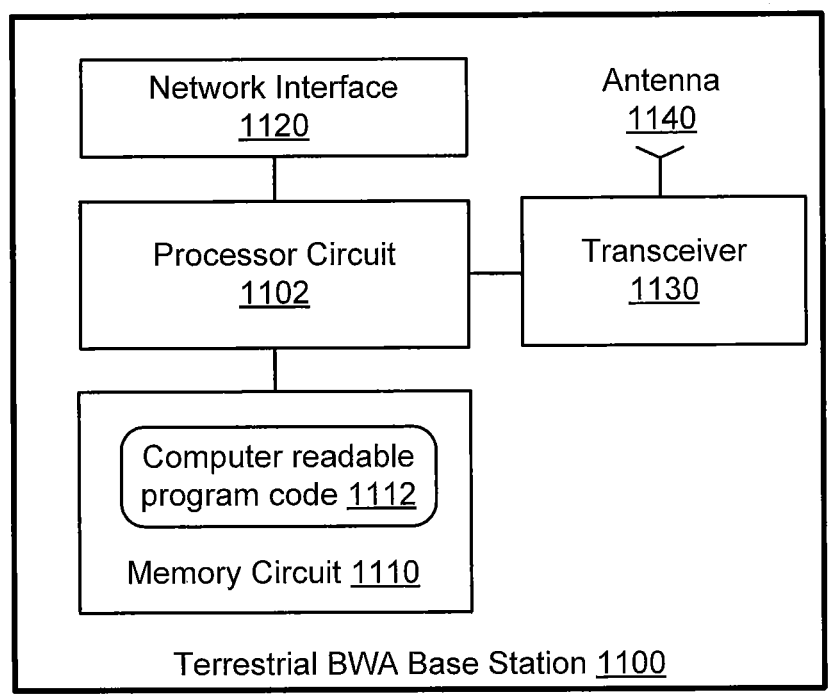
Figure 12:
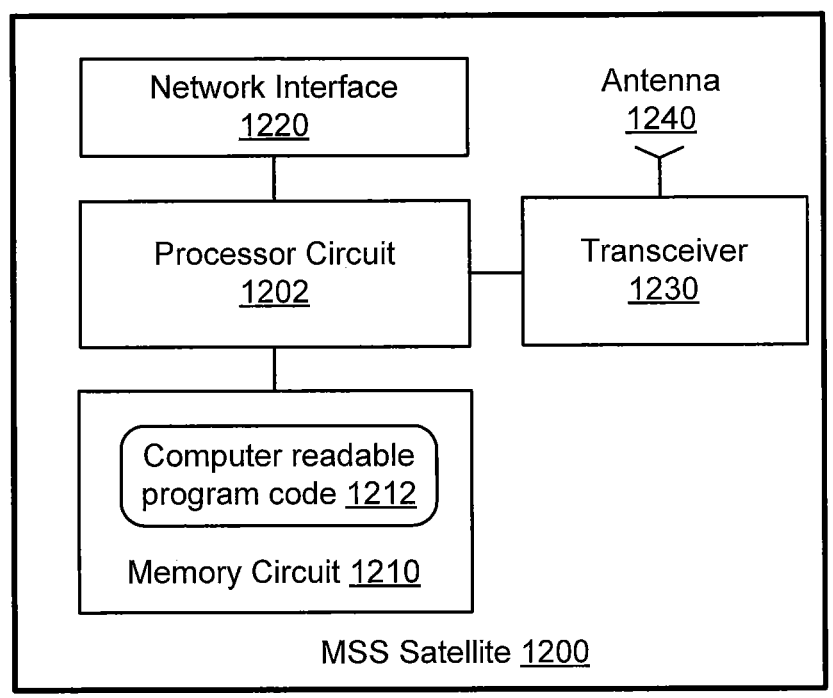

FIGS. 10 to 12 are devices that are configured to perform the operations described in the flowcharts of FIGS. 2 to 9. Referring to FIG. 10, electronic device 1000, such as a UE described according to various embodiments herein, may include a network interface 1020, a processor circuit 1002, a transceiver 1030 that may have an antenna 1040 for wireless communication, and a memory circuit 1010 that stores computer readable program code 1012. The processor or processor circuit 1002 may include one or more data processing circuits, such as a general purpose and/or special purpose processor, e.g., microprocessor and/or digital signal processor, which may be collocated or distributed across one or more networks. The processor circuit 1002 is configured to execute the computer readable program code 1012 in the memory 1010 to perform any of the operations and methods described herein as being performed by the UE. A wireless interface may be coupled to the processor circuit 1002 and may communicate with a terrestrial BWA base station, a MSS satellite, and/or other external network entity, directly or indirectly.

Referring to FIG. 11, electronic device 1100, such as a terrestrial BWA base station described herein, may include a network interface 1120, a processor circuit 1102, a transceiver 1130 that may have an antenna 1140 for wireless communication, and a memory circuit 1110 that stores computer readable program code 1112. For example, the transceiver circuit 1130 may be connected to a cellular antenna, or a 3G, 4G, LTE, or 5G antenna. The processor or processor circuit 1102 may include one or more data processing circuits, such as a general purpose and/or special purpose processor, e.g., microprocessor and/or digital signal processor, which may be collocated or distributed across one or more networks. The processor circuit 1102 is configured to execute the computer readable program code 1112 in the memory 1110 to perform any of the operations and methods described herein as being performed by the electronic device 1100 such as the terrestrial BWA base station. A wireless interface may be coupled to the processor circuit 1102 and may communicate with a UE, MSS satellite, and/or other external network entity, directly or indirectly.

Referring to FIG. 12, electronic device 1200, such as a MSS satellite described herein, may include a network interface 1220, a processor circuit 1202, a transceiver 1230 that may have an antenna 1240 for wireless communication, and a memory circuit 1210 that stores computer readable program code 1212. The processor or processor circuit 1202 may include one or more data processing circuits, such as a general purpose and/or special purpose processor, e.g., microprocessor and/or digital signal processor, which may be collocated or distributed across one or more networks. The processor circuit 1202 is configured to execute the computer readable program code 1212 in the memory 1210 to perform any of the operations and methods described herein as being performed by the electronic device 1200 such as the MSS satellite. A wireless interface may be coupled to the processor circuit 1202 and may communicate with a UE, terrestrial BWA base station, and/or other external network entity, directly or indirectly.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A method of issuing an emergency alert in a geographical area serviced by a Mobile Satellite Service (MSS) satellite and a terrestrial Broadband Wireless Access (BWA) base station, the method comprising:
    receiving a first emergency alert message from the MSS satellite by a user equipment (UE) in the geographical area using a first radio frequency band;
    receiving a second emergency alert message from the terrestrial BWA base station by the UE in the geographical area using a second radio frequency band; and
    responding to the first emergency alert message and/or the second emergency alert message by the UE with an indication of whether emergency assistance is needed, wherein the indication provides a request for the emergency assistance responsive to a lack of a user interaction with the UE,
    wherein the first radio frequency band overlaps the second radio frequency band,
    wherein the first radio frequency band is associated with a first blanking interval that does not overlap in time with a second blanking interval associated with the second radio frequency band,
    wherein the first emergency alert message is received from the MSS satellite during the second blanking interval, and
    wherein the second emergency alert message is received from the terrestrial BWA base station during the first blanking interval.

2. The method of claim 1, wherein the indication is provided when a user of the UE has not accessed the UE in a threshold period of time.

3. The method of claim 1, wherein the first emergency alert message from the MSS satellite and the second emergency alert message from the terrestrial BWA base station are responsive to an occurrence of an emergency event in the geographical area.

4. A method of issuing an emergency alert in a geographical area serviced by a Mobile Satellite Service (MSS) satellite and a terrestrial Broadband Wireless Access (BWA) base station, the method comprising:
    receiving a first emergency alert message from the MSS satellite by a user equipment (UE) in the geographical area using a first radio frequency band;
    receiving a second emergency alert message from the terrestrial BWA base station by the UE in the geographical area using a second radio frequency band; and
    responding to the first emergency alert message and/or the second emergency alert message by the UE with an indication of whether emergency assistance is needed, wherein the indication provides a request for the emergency assistance responsive to a lack of a user interaction with the UE,
    wherein the first radio frequency band overlaps the second radio frequency band,
    wherein the first radio frequency band is associated with a first frequency guard band that does not overlap in frequency with a second frequency guard band associated with the second radio frequency band,
    wherein the first emergency alert message is received from the MSS satellite in the second frequency guard band, and
    wherein the second emergency alert message is received from the terrestrial BWA base station in the first frequency guard band.

5. A method of issuing an emergency alert in a geographical area serviced by a Mobile Satellite Service (MSS) satellite and a terrestrial Broadband Wireless Access (BWA) base station, the method comprising:
    receiving a first emergency alert message from the MSS satellite by a user equipment (UE) in the geographical area using a first radio frequency band;
    receiving a second emergency alert message from the terrestrial BWA base station by the UE in the geographical area using a second radio frequency band; and
    responding, by the UE, with a request for emergency assistance responsive to a lack of a user interaction at the UE after receipt of the first emergency alert message from the MSS satellite and/or receipt of the second emergency alert message from the terrestrial BWA base station,
    wherein the first radio frequency band overlaps the second radio frequency band,
    wherein the first radio frequency band is associated with a first blanking interval that does not overlap in time with a second blanking interval associated with the second radio frequency band,
    wherein the first emergency alert message is received from the MSS satellite during the second blanking interval, and
    wherein the second emergency alert message is received from the terrestrial BWA base station during the first blanking interval.

6. The method of claim 5, wherein the request for emergency assistance is provided automatically by the UE, responsive to the lack of the user interaction at the UE.

* * * * *